United States Patent
Eslambolchi et al.

(10) Patent No.: US 7,822,417 B1
(45) Date of Patent: Oct. 26, 2010

(54) METHOD FOR PREDICTIVE MAINTENANCE OF A COMMUNICATION NETWORK

(75) Inventors: Hossein Eslambolchi, Los Altos, CA (US); John McCanuel, Bailey, CO (US); Paritosh Bajpay, Edison, NJ (US); Mihail Vasilescu, Middletown, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 481 days.

(21) Appl. No.: 11/290,845

(22) Filed: Dec. 1, 2005

(51) Int. Cl.
*H04W 4/00* (2009.01)

(52) U.S. Cl. .................... 455/432.3; 370/228; 379/9; 455/423; 455/67.11

(58) Field of Classification Search ................. 455/423, 455/432.3; 370/228; 379/9
See application file for complete search history.

(56) References Cited

U.S. PATENT DOCUMENTS

| | | | |
|---|---|---|---|
| 6,442,393 B1 * | 8/2002 | Hogan | 455/456.5 |
| 6,496,476 B1 * | 12/2002 | Badt et al. | 370/228 |
| 7,124,059 B2 * | 10/2006 | Wetzer et al. | 702/184 |
| 2005/0038579 A1 * | 2/2005 | Lewis | 701/29 |

* cited by examiner

*Primary Examiner*—Huy Phan
*Assistant Examiner*—Chuck Huynh

(57) ABSTRACT

Systems and methods for predicting one or more service problems in a communication network are described. In one implementation, a threshold is set and signal data are collected at an interface component. The collected data are compared to the threshold, and depending on the comparison between the collected data and the threshold, a trend analysis is performed on the collected data.

12 Claims, 2 Drawing Sheets

METHOD FOR PREDICTIVE MAINTENANCE OF A COMMUNICATION NETWORK

BACKGROUND

The present invention relates to communication network management. In particular, but not by way of limitation, the present invention relates to systems and methods for predicting one or more service problems in a communication network.

In the competitive telecommunications industry it is advantageous to identify communication network troubles quickly and get them resolved as soon as possible. This requires quick and reliable trouble detection and isolation to ensure network integrity and maintain both customer satisfaction and customer loyalty.

Previously known network error detection techniques, for example, have limited or no automation for detecting performance problems in advance of future failure. Typically, these techniques employ technicians to analyze service impacting conditions as they occur in a communication network. In large networks, where the number of service impacting conditions are high, the response time needed to review and analyze the service impacting conditions is constrained by the number of technicians available to review the conditions. It is not uncommon for many service impacting conditions to go unnoticed because of resource constraints and/or human error. As a consequence, service is impaired and failures result when they otherwise could be preemptively repaired.

Accordingly, previously known techniques for detecting errors in communication networks do not operate in a convenient, cost-effective manner and will most certainly not be satisfactory in the future. There is a need for real-time monitoring of the entire communication path from customer installation to customer installation that provides a proactive method for trouble detection and prediction in the communication network.

SUMMARY OF THE INVENTION

Embodiments of the present invention include methods for predicting one or more service problems in a communication network. In one embodiment, a threshold is set for an interface component and signal data are collected at the interface component. The collected data is compared to the threshold, and a determination is made as to whether the collected data are indicative of a trend.

Exemplary embodiments of the present invention are more fully described in the Detailed Description section. It is to be understood, however, that there is no intention to limit the invention to the forms described in either this section or in the Detailed Description section of this application. One skilled in the art will recognize that there are numerous modifications, equivalents and alternative constructions that fall within both the spirit and the scope of the invention as expressed in the claims.

BRIEF DESCRIPTION OF THE DRAWINGS

Various advantages and a more complete understanding of the present invention are apparent and more readily appreciated by reference to the following Detailed Description and to the appended claims when taken in conjunction with the accompanying Drawings wherein:

DETAILED DESCRIPTION

The present arrangement described below allows a service provider to manage troubles in a communication network. Although specific examples are developed using telecommunication technologies, one of ordinary skill in the art will recognize that alternative technologies are within both the scope and the spirit of the present invention.

Figure 1:
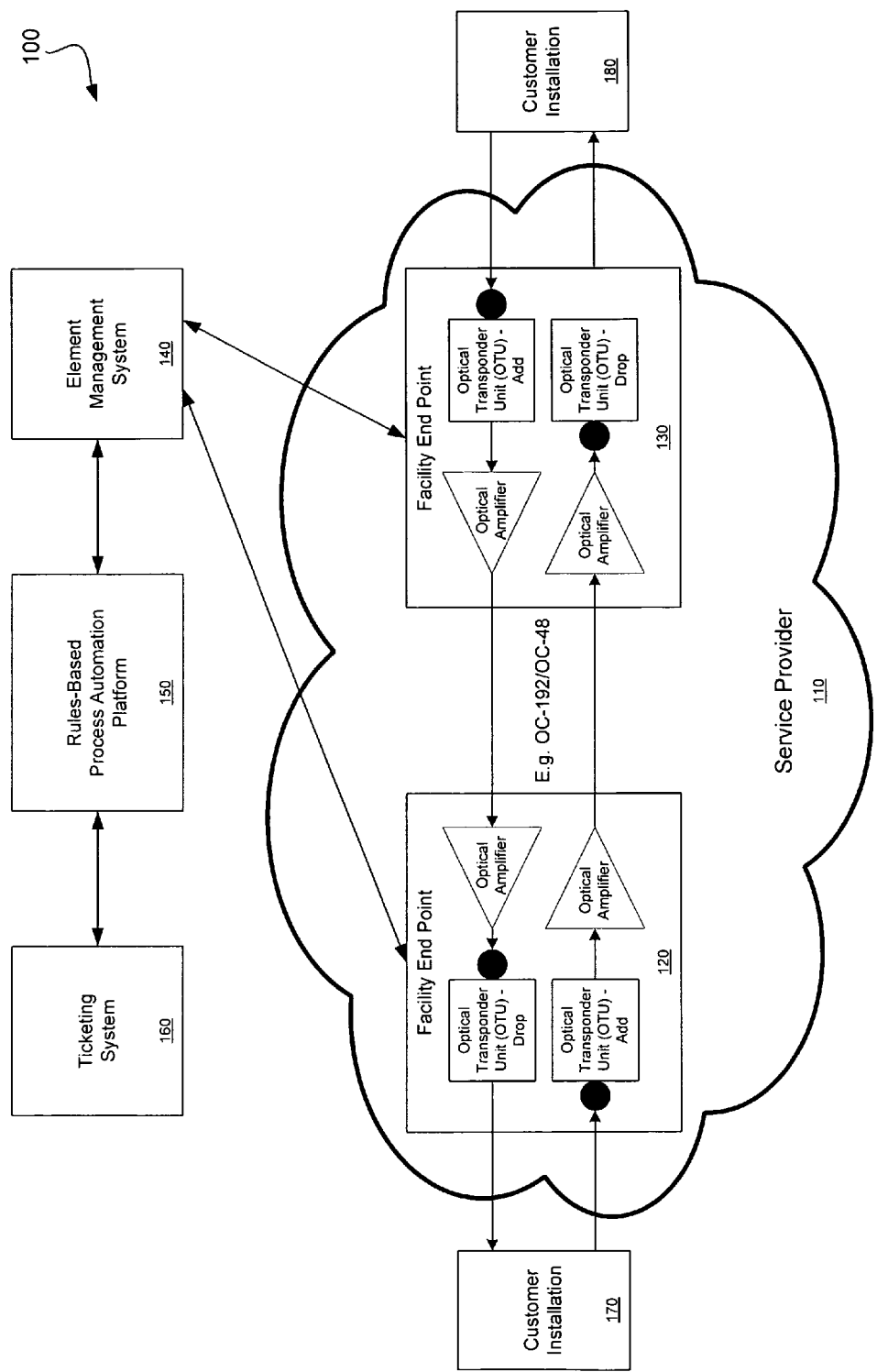
FIG. 1 depicts a block diagram of a communication network in accordance with an exemplary embodiment of the present invention.

FIG. 1 depicts a communication system 100 in accordance with an exemplary embodiment of the present invention. The term "communication system" is used herein to refer to any type of communication network, including a customer-to-customer communication network, a customer-specific communication network, a service provider-specific communication network, an access provider-specific communication network, a customer-to-service provider communication network, a customer-to-access provider communication network, and an access provider-to-service provider communication network, as well as other variations recognizable in the art.

The system 100 includes a service provider network 110 that includes facility endpoints 120 and 130, an element management system 140, a rules-based process automation platform/network management system 150 and a ticketing system 160. The system 100 may also be considered to include customer installations 170 and 180. The facility endpoints 120 and 130 each comprise one or more optical transponder/translation units (OTU) and one or more optical amplifiers, all of which are included in an optical carrier (OC) line system (e.g. OC-192, OC-48, etc.). In one direction an OTU is adapted to convert a communication light beam into an electrical signal and confirm its intensity and waveform. An electrical to optical operation an OTU can convert an electrical signal into a communication light beam, thus assuring the quality of the communication light beam. In the bi-directional system of FIG. 1 the first facility endpoint 120 has two OTUs, an add "OTU than performs the electrical to optical conversion, and a "drop" OTU that performs the optical to electrical conversion. Also in the embodiment the second facility endpoint also has a drop and an add OTU.

The components in the system 100 communicate with each other using bi-directional communication technology. For convenience only, embodiments of the present invention are generally described herein with relation to optical networks. More specifically, the embodiments of the present invention are generally described herein with relation to synchronous optical networks (SONET). One of ordinary skill in the art can easily adapt these implementations to other types of communication networks or systems.

While referring to FIG. 2, simultaneous reference will be made to FIG. 1. Attention is now drawn to FIG. 2, which illustrates a process flow diagram 200 representative of operation of an exemplary embodiment of the present invention.

Figure 2:
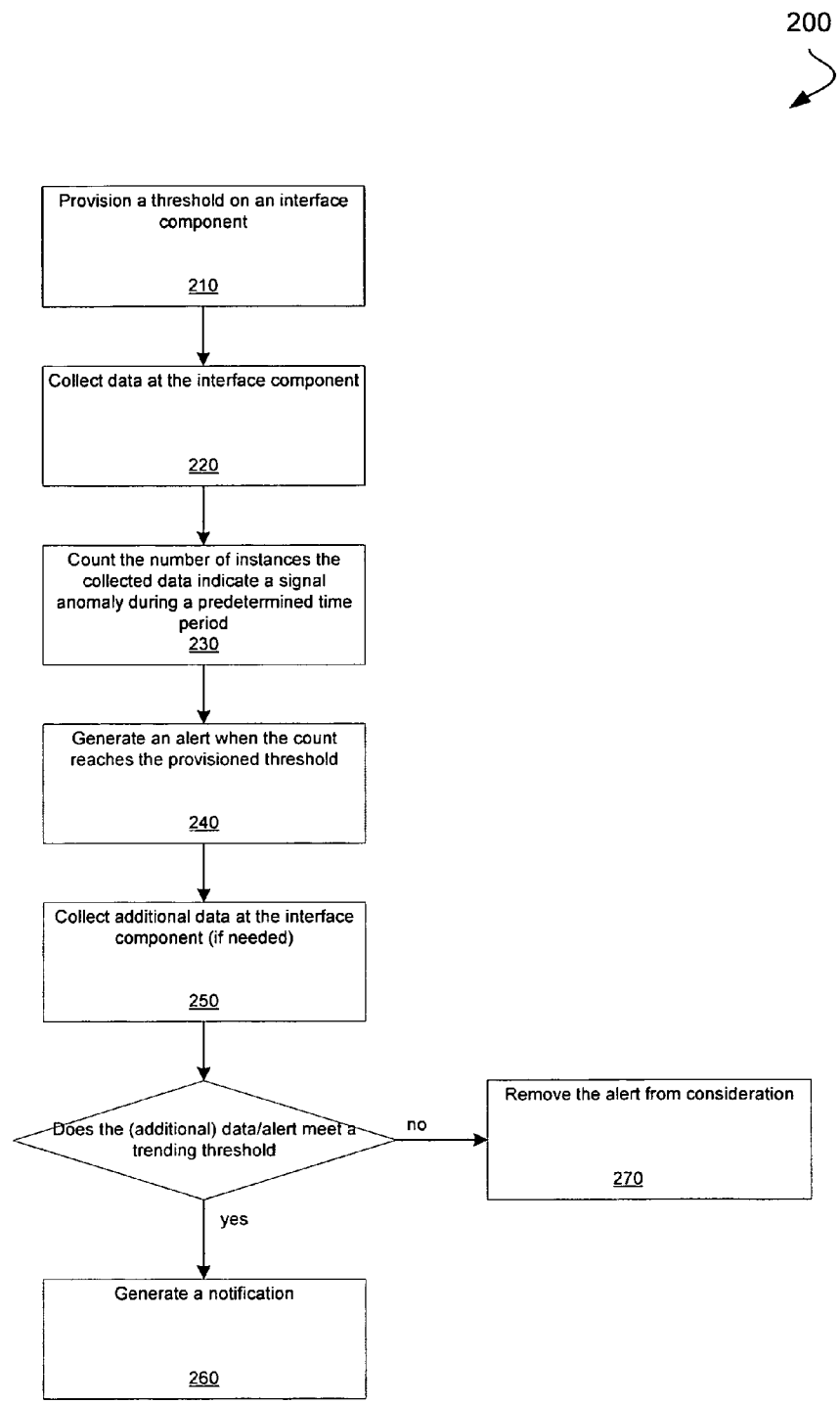
FIG. 2 illustrates a process flow diagram representative of operation of an exemplary embodiment of the present invention.

According to FIG. 2, one or more performance related data thresholds are provisioned for one or more interface components (e.g., the one or more OTUs) (Block 210). The threshold is set to indicate an acceptable level or a boundary of variation in service quality permissible on the network. Quality and maintenance assessments are then made with reference to these thresholds. In an exemplary embodiment, the provisioned thresholds are set to a number that is compared to non-zero performance monitoring (PM) data collected from the interface components. Such a number may be set low enough to correct a service problem prior to substantial degradation of the service. The PM data are based on standards of the American National Standards Institute and may include performance report messages, network performance report messages, far end block errors, errored seconds, severely errored seconds, control source slips, unavailable seconds, bursty errored seconds, severely errored framing seconds, line errored seconds, degraded minutes and/or other PM data known in the art.

After the thresholds are provisioned, data that are measurable against or comparable to the provisioned thresholds are collected from the interface components for a predetermined interval of time (Block 220). The predetermined interval of time may be measured in any unit of time, including seconds, minutes, hours and days. In an exemplary embodiment, the collected data are performance monitoring (PM) data and the collected PM data are stored in fifteen-minute "buckets" which store PM data collected during a fifteen-minute interval of time. The collected PM data in each bucket may be retained for a specified time period for historical analysis.

In one possible detection technique, while the data that are measurable against the provisioned thresholds are collected, a counter is incremented every time the data indicates a signal anomaly. In an exemplary embodiment, the signal anomaly is indicated by non-zero PM data. In this case, the counter tracks the cumulative number of non-zero PM data collected during the predetermined interval of time. After the predetermined interval of time elapses, the counter is reset to zero.

If, at a particular interface element, the collected PM data count meets or exceeds a provisioned threshold, then a threshold crossing alert (TCA) is generated for that particular interface element (Block 240) and sent to the element management system (EMS) 140. The EMS 140 forwards the TCA to the network management system 150, which performs rules-based analysis on the collected data.

In an optional step, more data may be collected from the interface component (Block 250); nonetheless, the network management system 150 applies a trending threshold test to the TCA. The trending threshold test is in place to filter out TCAs that do not need attention. Typically, large networks generate large amounts of TCAs. Some TCAs are indicative of current or future problems (e.g., a service degradation). Other TCAs are indicative of one-time events and do not need attention (e.g., when somebody steps on a fiber optic cable and briefly disrupts service). Filtering of TCAs becomes necessary in order to use resources efficiently. Otherwise, if all TCAs were processed, additional network resources would be required to keep up with the large volume of all TCAs. As a consequence, a service provider of the system 100 would incur additional operating expenses by way of equipment and personnel. Additionally, if all TCAs were processed, the large volume may create a backlog of TCA processing that would delay response time to service problems.

In an exemplary embodiment, the network management system 150 processes TCAs that are indicative of service degradation in the system 100. The network management system 150 provides a trend analysis of past and present collected data over a configurable period of time (e.g., the data collected with respect to Block 220 and/or Block 250). The configurable time period may be set to a value based on various considerations, including future anticipation of service needs, past experience, network resources, the size of the network, and the response time required for repair. The trend analysis compares the current collected data to past collected data in order to determine whether a particular service problem is consistently being detected. If the service problem is consistently being detected, the trend analysis may also determine whether the service quality is becoming increasingly degraded over the configurable time period.

If the network management system 150 receives a TCA that indicates consistent detection of a service problem or increased degradation of service quality, a notification is generated and sent to a work center for more analysis (Block 260). Otherwise, if the network management system 150 determines a TCA does not indicate a trend showing consistent detection of a service problem or increased degradation of service quality, then that TCA is not considered for more analysis (Block 270).

When the network management system 150 receives a TCA that indicates a trend showing consistent detection of a service problem or increased degradation of service quality, a ticket is generated and sent to a work center in charge of managing the network 100. The ticket may include the specific degradation information (e.g. an OC-48 or OC-192 facility degradation), the date, the time, the interface element reporting the TCA (e.g. the one or more OTUs), the facility (e.g. a Common Language Facility Identification), and the PM data count.

The process described above with respect to FIG. 2 can be modified to monitor a plurality of network components in the network 100, and also rank those network components in a specified order. For example, the specified order may be controlled by the magnitude of a service problem being experienced at a particular network component, or by the importance of a particular network component.

The arrangement provides an automated rules-based processing platform that can either collect or receive performance data for one or more network interface elements, such as the illustrated optical transponder units. The performance data can either indicate on its own the existence of a failure or an error, or when taken with accumulated data may indicate a failure, an error exists, or may indicate that there is a trend to equipment failure or error that may degrade communication service.

In conclusion, the present invention provides, among other things, systems and methods for detecting errors in a communication network. Those skilled in the art can readily recognize that numerous variations and substitutions may be made in the present invention, its use and its configuration to achieve substantially the same results as achieved by the embodiments described herein. Accordingly, there is no intention to limit the invention to the disclosed exemplary forms. Many variations, modifications and alternative constructions fall within both the scope and the spirit of the disclosed invention as expressed in the claims.

What is claimed is:

1. A method for automatically predicting one or more service problems in a communication network comprising:

setting a threshold for an interface component in a rules-based automated servicing platform;

receiving device performance data from said interface component;

tracking a count of each time that said device performance data indicates a signal anomaly;

generating at least one threshold crossing alert (TCA) if said count exceeds said threshold;

filtering a plurality of TCAs to remove one or more TCAs that do not need attention to generate at least one filtered TCA;

determining if said at least one filtered TCA is indicative of a negative trend regarding performance of said interface component over a configurable time period; and comparing the device performance data to a previously collected device performance data that was collected over said configurable time period; and automatically analyzing the device performance data and the previously collected device performance data in accordance with rules of said rules-based automated serving platform to determine whether a trend of service degradation exists.

2. The method of claim 1, wherein the trend of service degradation exists when the device performance data and the previously collected device performance data show a degraded signal quality at the interface component over the configurable time period.

3. The method of claim 1, wherein the filtering further comprises:

coordinating a repair of the interface component if the trend of degradation exists.

4. The method of claim 1, wherein the device performance data are performance monitoring data.

5. The method of claim 4, wherein the performance monitoring data are errored seconds data.

6. The method of claim 1, wherein the interface component is located at an end point of a network component.

7. The method of claim 6, wherein the end point is an optical transponder unit.

8. The method of claim 6, wherein the end point receives a signal from a customer installation or an Internet protocol backbone router.

9. The method of claim 6, wherein the end point sends a signal to a customer installation or an internet protocol backbone router.

10. The method of claim 1, wherein the device performance data is collected over a predetermined time period.

11. The method of claim 10, wherein the threshold is based on non-zero performance monitoring data that are collected during the predetermined time period.

12. A method comprising:

establishing a rules based engine for analyzing system performance data;

receiving data indicative of performance characteristics of a plurality of network devices;

analyzing said received data in accordance with the rules based engine, where a threshold is set for each of said plurality of network devices;

tracking a count of each time that said analyzing said received data indicates a signal anomaly;

generating at least one threshold crossing alert (TCA) if said count exceeds said threshold;

filtering a plurality of TCAs to remove one or more TCAs that do not need attention to generate at least one filtered TCA;

determining if said at least one filtered TCA is indicative of a negative trend regarding performance of said interface component over a configurable time period;

identifying one or more of said plurality of network devices as needing maintenance based on said filtering; and prioritizing the one or more of said plurality of network devices needing maintenance in accordance with the rules based engine.

\* \* \* \* \*